Dec. 12, 1939.  W. F. ZIMMERMANN ET AL  2,183,362
ROLLER BEARING MOUNTED WORK TABLE
Filed March 24, 1939  4 Sheets-Sheet 1

INVENTORS
William F. Zimmermann
BY Granger Davenport
Albert F. Nathan
ATTORNEY

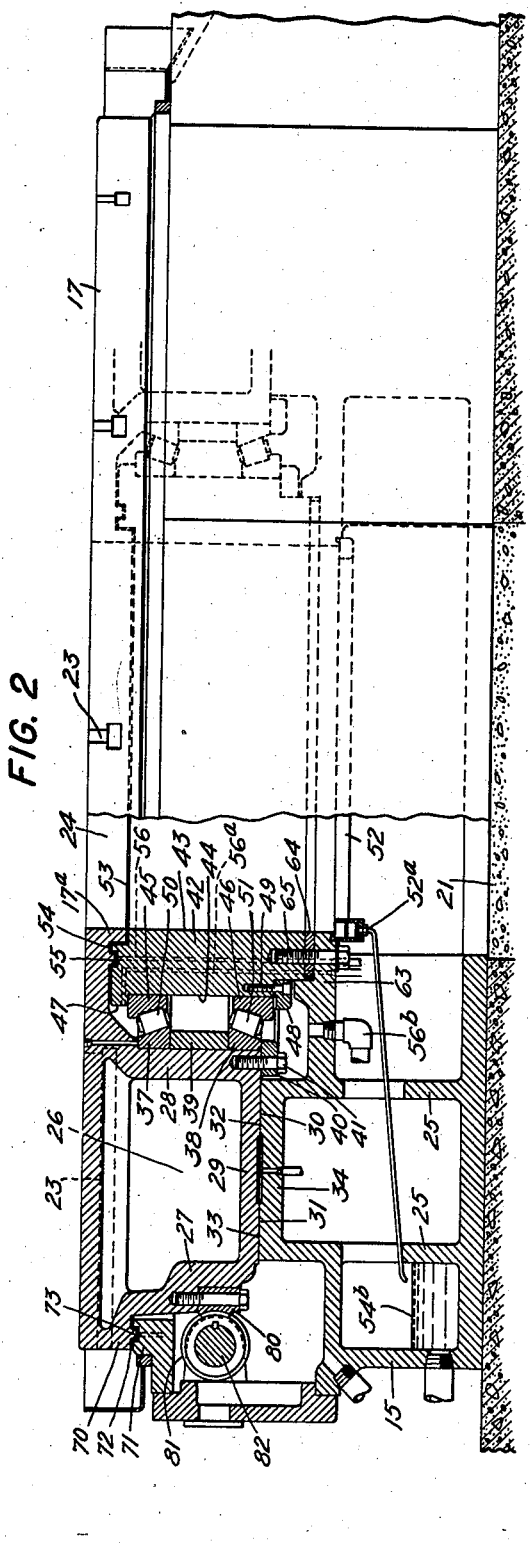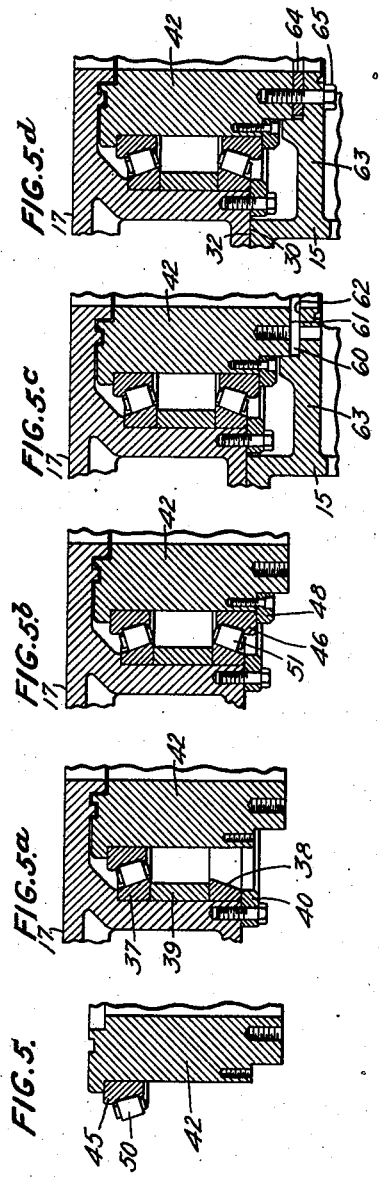

Dec. 12, 1939. W. F. ZIMMERMANN ET AL 2,183,362
ROLLER BEARING MOUNTED WORK TABLE
Filed March 24, 1939    4 Sheets-Sheet 3

INVENTORS
William F. Zimmermann
BY Granger Davenport
Albert F. Nathan
ATTORNEY

Dec. 12, 1939.　　W. F. ZIMMERMANN ET AL　　2,183,362
ROLLER BEARING MOUNTED WORK TABLE
Filed March 24, 1939　　4 Sheets-Sheet 4
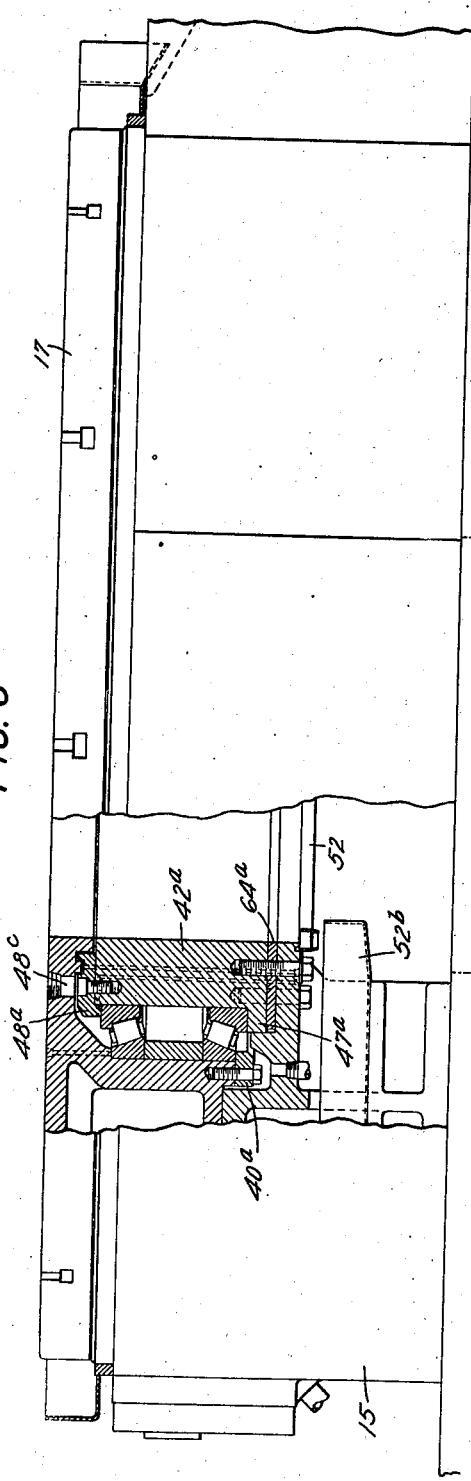
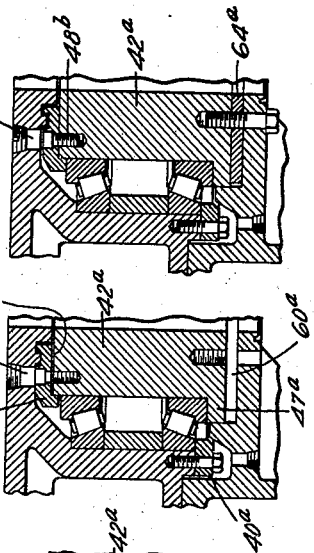
INVENTORS
William F. Zimmermann
BY Granger Davenport
Albert F. Nathan
ATTORNEY Patented Dec. 12, 1939

2,183,362

UNITED STATES PATENT OFFICE 2,183,362

ROLLER BEARING MOUNTED WORK TABLE

William F. Zimmermann, Maplewood, and Granger Davenport, Verona, N. J., assignors to Gould & Eberhardt, Newark, N. J., a corporation of New Jersey Application March 24, 1939, Serial No. 263,882

14 Claims. (Cl. 90—58)

The present invention concerns rotary work tables, particularly for gear hobbing machines, and has for its primary objective to render available a hollow one-piece rotary table structure, large in diameter, capable of maintaining the highest degree of accuracy in the rotation of any point thereon about its axis.

In the hobbing of large turbine gears and particularly those of a diameter of 100 inches or more and intended to be run at high velocity, say 12,000 ft. per minute, the greatest care and precision must be employed in the hobbing of the teeth in order to have the gear run quiet and true, and such precision cannot be built into the gear if the rotary table of the hobbing machine upon which the gear blank is mounted has the slightest amount of run-out. To prevent the error due to table run-out, the present invention proposes a structure wherein the truth of the rotating table may be held within a tolerance of .0003 inch.

A further aim of the invention is to render available a table structure that will accommodate gears having relatively large central hubs in a manner whereby the hub or shaft on which the gear is mounted may project into a central hole in the rotating table and accurately centered. To accommodate the larger classes of work, such as turbine gear work, the hole in the table should have a diameter approximately 32 inches and all of the radial and vertical thrust bearings for supporting the work table, work holding fixture, and workpiece, must be located outside the boundary of the central hole. This presents a problem difficult of solution if one wishes to attain the required accuracy in rotation.

Still a further aim of the invention is to render available a large one-piece rotary work table structure, the individual parts of which may be readily manufactured and capable of being assembled together and pre-loaded as a unitary assembly prior to the mounting of the assembly upon the table bed, and when so assembled effectively sealed against the entrance of chips and dirt to the bearing surfaces and other critical regions of the mechanism.

As a further refinement the invention aims to provide a structure embodying the foregoing characteristics and which lends itself readily adaptable to supplemental adjustment to compensate for wear on the bearings and surfaces, and which adjustment may be effected without dismantling the entire rotary table assembly.

In the attainment of the objectives of this invention, it is proposed to provide a large diameter table member with a central opening, approximately ¼ to ⅓ the diameter of the table, for receiving the largest of workpieces and appropriate gauges for locating and centering same, and to have the top portion of the table that defines the central opening, overlie the mounting upon which the table revolves. In this instance the mounting is on a large tubular post and the upper surface of the table is in one integral piece from its inner to its outer edge. The design is such that the table overlies the central axle and the chips or other foreign matter that may find their way into the central hole, may fall through the axle to a pan underneath and not collect in cracks or recesses in the table and eventually find their way to the bearings or other critical parts of the mechanism underlying the table. Such regions are, as will hereinafter appear, additionally sealed against entrance of foreign matter.

It is further proposed to make the large hollow post on which the table rotates as a separate element from the base of the machine to the end that it may be conveniently and accurately assembled into the table proper on roller bearings and the roller bearings accurately positioned and preloaded before the assembly as a whole is mounted upon the main frame or base.

In the present instance, the hollow support for the table, may for example, have the upper cone race of the bearing mounted thereon prior to its insertion into the table, and thereafter the upper set of rollers, cup race, bearing spacer, and lower cup race inserted successively into the table. The various surfaces may then be matched and those parts clamped firmly in position. The lower set of rollers and cone race may then be placed over the lower end of the tubular support and clamped in position, and the bearings as a whole preloaded by an annular flange carried at the end of the support.

This method of assembling insures against injury to any of the parts incident to handling, scraping, or matching of their surfaces and when completely assembled, the unit may be placed bodily upon the main bed of the machine. The central hollow post of the assembly is arranged to seat upon one or a series of shims, ground to the proper thickness, which in turn are supported, throughout their annular area, by a projecting flange of the main bed. On assembling, allowance is made for an oil film between the annular tracks or ways of the table and the central shaft firmly bolted at its correct height to the main base of the machine. Subsequent adjustments in vertical height of the tubular post, incident to a repositioning of one or more of the cone races in compensating for wear, is effected by removing and grinding or otherwise adjusting the shims under the central post and rebolting the parts together. With the present invention difficult problems of construction and assembling of a plurality of large diametered roller bearing cup and cone races in true running alignment and the subsequent difficulties encountered in preloading the bearings, assembling, and later adjustment for wear, are avoided.

Other objects and advantages will be in part indicated in the following description and in part rendered apparent therefrom in connection with the annexed drawings.

To enable others skilled in the art to fully apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 2 is an enlarged view partly in section illustrating a preferred form of mounting for the rotary table illustrated in Fig. 1.

Figure 3:
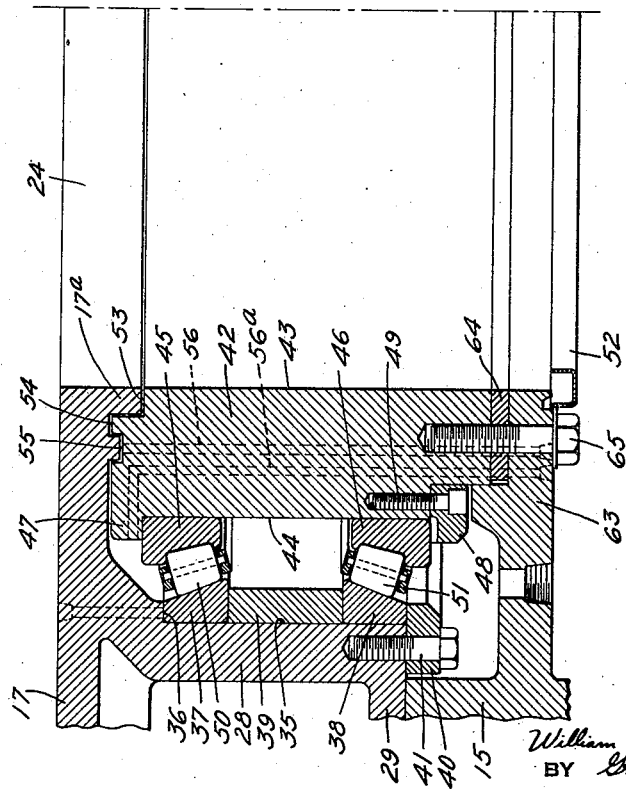
Fig. 3 is an enlarged detail view of the table roller bearing mounting.

Figs. 5 to 5$^d$, inclusive, are views illustrating the assembly sequence for the mounting disclosed in Figs. 2 and 3.

Fig. 6 is an elevational view of a rotary table, partly in section, to illustrate a modified form of a roller bearing mounting.

Figs. 7 to 7$^d$, inclusive, are views illustrating the sequence of assembly of the modified form of table mount.

Figure 1:
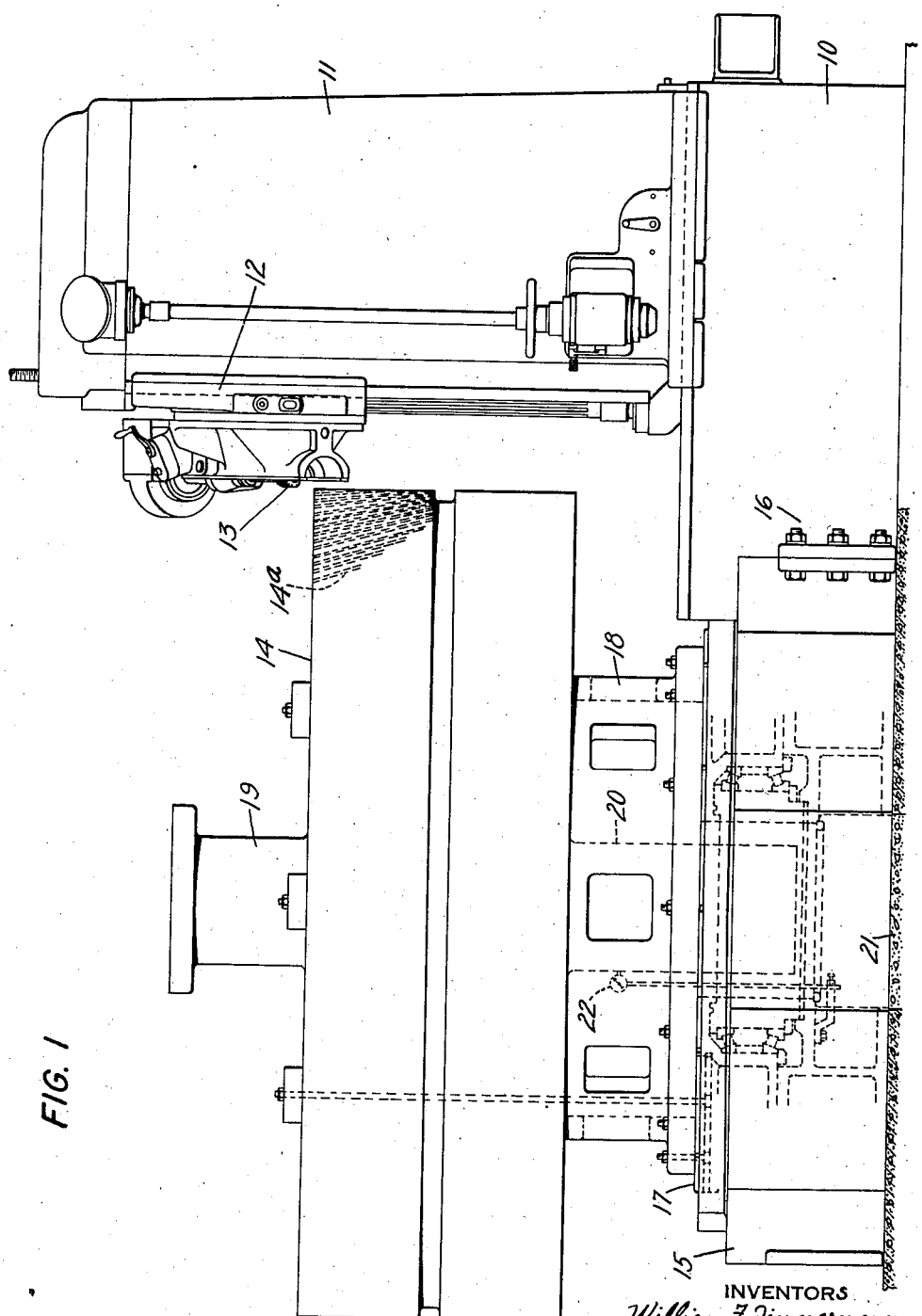
Figure 1 is a side elevation of a hobbing machine embodying the present invention.
Figure 4:
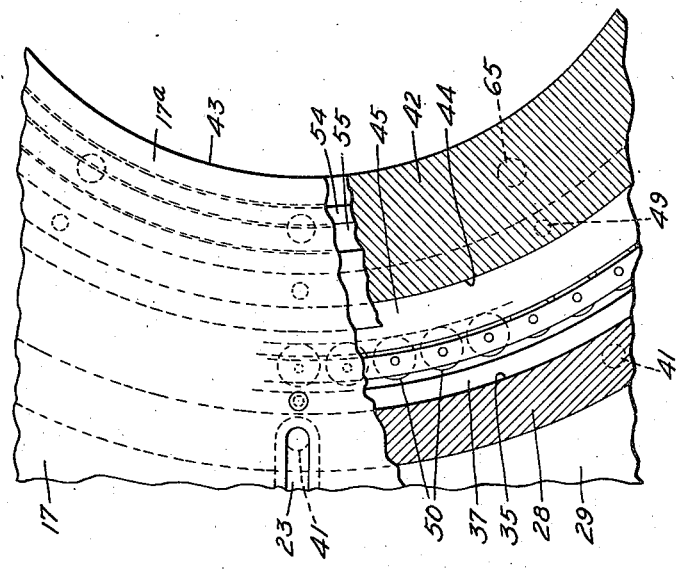
Fig. 4 is a fragmentary plan view of the bearing mounting.

Referring more particularly to Fig. 1 of the drawings, the hobbing machine illustrated comprises a base member 10, upon which is adjustably mounted an upstanding cutter stanchion 11, and a cutter carriage 12 translatably mounted upon guideways at the front face of the stanchion. The cutter carriage 12 carries a hobbing cutter 13 that operates upon the work blank 14. The parts just mentioned are, it will be understood, propelled in synchronism by suitable power transmissions, and as the gear blank 14 is slowly rotated, the rotated hob 13 feeds slowly downward (from the position shown in Fig. 1) and progressively cuts the teeth 14$^a$ in the periphery of the blank.

The base 15 for the work table may be a part of the main base 10 if desired. Preferably it is made a separate unit and bolted thereto as at 16. The work table 17 is supported by the base 15 and has mounted thereon a work fixture 18 which supports the work piece. The work blank 14 illustrated in Fig. 1 represents a large turbine gear approximately 144 inches in diameter, and, as is customary with such work, relatively large journals 19 and 20 are formed integral therewith.

To attain increased rigidity in the mounting of the work, the machine has been designed so that the lower journal 20 may pass through the work fixture, work table and base of the table and into a hole 21 in the foundation, if necessary. Inasmuch as the size of the journals approach the diameter of two feet or more, an exceptionally large central opening must be provided in the table structure to accommodate such parts. The central opening must, however, be made substantially larger than the maximum size journal bearing, in order to afford ample room for the operator to set and adjust therein suitable gauges 22 for the purpose of accurately centering the gear on the table.

The foregoing considerations, therefore, require that the table structure have a central opening approximately 32" in diameter and that all of the radial and vertical thrust bearing surfaces be arranged outside of that region.

In a hobbing machine where the ultima of accuracy is essential, the problem of supporting and mounting a rotatable table or bearings whereby the truth of the rotating table must be maintained within half-a-thousandth of an inch, is in itself a major task. The problem is further compounded where, as in the present instance, a very large hole must be provided in the center of the table and all radial and vertical thrust bearings must be arranged outside. The present invention proposes a table structure wherein the problems and difficulties above mentioned are encountered and have been successfully overcome.

Referring to the Figures 2–5$^d$, inclusive, a preferred form of table structure and its manner of assembling is illustrated. The top of the table 17 is formed with the usual T-slots 23 for bolting down work fixtures and work-pieces, and is provided at its center with a large opening 24 which is approximately ⅓ of the diameter of the entire table. The table 17 and base member 15 are each of cellular construction being suitably reinforced by transversely arranged ribs and flanges 25.

The table 17 is provided with an annular depending portion 26 consisting of upright walls 27 and 28 and a lower horizontal wall 29 which is provided at its under surface with annular bearing surfaces 30 and 31. Complemental bearing surfaces 32 and 33 are provided upon an upstanding annular portion 34 of the base 15. The bearing surfaces just mentioned have a total area proportioned to take the entire vertical thrust of the work table, work fixture, and workpiece mounted thereon, thereby to relieve the bearings about which the table revolves, of all such vertically acting forces.

A preferred form of drive for the rotatable table comprises a worm gear 80 secured to the outer and lower periphery of the table as illustrated more clearly in Fig. 2 of the drawings. The tangentially disposed worm 81, mounted upon a drive shaft 82 journaled in bearings provided by the table base, receives power from the main transmission of the hobbing machine and serves to drive the table in synchronism with the movements of the hobbing cutter.

The bearings for taking the radial thrusts of the table and for maintaining the table truly concentric with the axis of rotation, are preferably disposed radially between the annular surfaces 30, 32 and the outer margins of the central hole 24, as indicated more clearly in Figs. 2 and 3.

An annular web 28 depends from the table top at a region well outside of the margins of the hole 24, and is provided with a machined cylindrical surface 35 which terminates in an annular abutment 36. Within the cavity are mounted upper and lower roller bearing cup races 37, 38 and an intervening spacer element 39, that are later clamped firmly in position by a retainer ring 40 secured to the table by a series of bolts 41.

A hollow axle or pintle 42 projects into the table from its underside and provides a central support upon which the table is adapted to revolve, and comprises essentially a cylindrical member having a large inner bore 43 and an outer machined surface 44. Upper and lower cone races 45 and 46, which complement the cup races 37 and 38, are mounted upon the outer surface of the axle. The upper race abuts against an annular flange 47 provided by the axle and the lower race is held in position by a removable retainer ring 48 which in turn is held against a step shoulder in the axle by a series of screws 49.

An important feature of the present invention is the arrangement whereby the several bearing races 37, 38, 45, and 46, and the rings of rollers 50 and 51 which cooperate therewith, are fully enclosed and guarded against the entry of small chips, dirt, or other foreign material that may be carried by the copious flow of cutting lubricant that usually flows over the tables of machines of this character.

As shown in the drawings, the radial thrust bearings are located entirely underneath the top surface of the table and well to the outside of the central opening 24 therein. With this arrangement, a contiguous portion 17ª of the table overlies not only the radial thrust bearings but the entire annular top of the hollow axle 42 and effectively guards against the entrance of foreign material to the bearings. Matter that flows or is swept across the table top falls downward through the opening 24 in the table and through the bore 43 of the axle, to an annular catch basin 52 located at the bottom thereof. A drip pan 52 which extends as a U-shaped ring around the lower inner periphery of the hollow axle, is provided with a strainer and an exit conduit 52ª which conducts the collecting coolant to a sump 54ᵇ located in the table base.

The only crevice that exists through which foreign matter may find its way to the bearings, is the lateral crevice 53 between the top of the axle and the underside of the table, and that crevice is further effectively sealed by a labyrinthian form of passage way. As shown in Fig. 3, the upper end of the axle and the under surface of the overhanging portion 17ª of the table are provided with interfitting annular ribs and grooves 54 and 55 which, in section, afford a series of reverse bends that effectively prevent the ingress of foreign matter likely to cause wear or damage to the radial bearings. In conjunction with the labyrinthian form of passage 53, a high pressure oiling system is provided having a conduit 56 leading to the narrow space between the interlocking ribs and grooves 54 and 55 whereby they may be periodically charged with a sealing lubricant at a pressure sufficiently high to expell any fine particles of dirt that may have become lodged in the entrance end of the crevice 53.

To prevent the entrance of grit or other foreign matter to the bearing surfaces and table driving mechanism from the outer periphery of the table, the outer marginal edge 70 of the table is adapted to overlie the top portions 71 of the base 15. The intervening crevice 72 leading to the mechanism underlying the table top is interrupted by a series of reverse bends formed by interlocking rib and groove formations 73 formed upon the respective elements. And, as provided at the top of the central axle, a high pressure oiling system conduit leads to the outer labyrinth passage way by which it may be periodically charged with lubricant which will, at the same time, expell the dirt that may have accumulated therein.

With a table of the size indicated wherein the outer and inner bearing races 37 and 45 are approximately four feet in diameter, and which apart from the difficulties encountered in their accurate manufacture, the greatest care and skill is required in their assembly into the table if one expects a true running table when completed. In actual practice, it is also extremely difficult to make the large round surfaces and to have them concentric with each other and the present table mounting has, therefore, been developed along lines requiring the minimum number of cylindrical surfaces and parts. It will also be noted that the parts are so organized and related as to require the least amount of handling during the fitting and matching of the elements to each other and to the main base of the table.

Figs. 5 to 5ᵈ, inclusive, illustrate the assembly sequence of a bearing mount constructed in accordance with this inventon and in which Fig. 5 indicates the axle detached from the base and upon which is placed the upper cone race 45 and a set of rollers 50. For convenience in assembling the table 17 is preferably placed upside down and the parts referred to in Fig. 5 inserted thereinto as illustrated in Fig. 5ª. The upper cone race 37, spacer ring 39 and lower cup race 38 are next successively inserted and the retaining ring 40, fitted, matched, and bolted to the table. Thereafter, the lower set of rollers 51 and cone race 46 are placed in position as shown in Fig. 5ᵇ and the retainer ring 48 matched and fitted and bolted securely to the axle 42. During the operation of matching the contacting surfaces of the retainer ring 48, both sets of bearings are placed under pressure, in other words, preloaded to the desired degree.

At this stage of the assembly process, the table is completely mounted upon the axle and forms therewith a unitary assembly that subsequently is placed upon the base 15 as indicated in Fig. 5ᶜ. At that point in the assembly operation, the space 60, between the lower end 61 and the upper surface 62 of the supporting flange 63 of the base 15, is carefully measured and a shim or a series of shims 64 carefully ground to fit, with due allowance being made for a film of oil between the thrust bearing surfaces 30, 32 and 31, 33. The table assembly is then removed from the base and the ground shim 64 is placed in position and the table assembly again mounted and put in place thereon. A series of pins and bolts 65 are provided for holding the axle securely in place upon the main base of the table.

It will be evident from the foregoing that each of the component elements entering into the present table mounting requires but a single handling operation in the course of its being fitted into the machine, and once the parts have been properly fitted and clamped in place, no further adjustment or removal is required to enable the fitting and assembling of other parts.

In the event of subsequent wear upon the bearings, such wear is readily compensated for by withdrawing the bolts 65 and removing the table, bearings, and axle, bodily as a unit, from the base 15. When so removed, convenient access to the retainer ring 48 is had, which may then be rematched to take up the wear and give the desired preloading. Thereafter the table assembly is again placed upon its base and the space 60 underlying the hollow axle is measured and the shim 64 ground to suit. The table assembly is again removed, as in step Fig. 5c above mentioned, and reassembled upon the shim 64 and the hollow axle bolted firmly to the base.

To insure an adequate supply of oil to the roller bearings and also to guard against the draining of oil from the sealing grooves 54—55 into the roller bearings and thus destroying their effectiveness, a separate system of oil conduits 56a having a return line 56b is provided for the bearings.

In the modified forms of mounting illustrated in Figs. 6 and 7 to 7d, inclusive, the general constructional details of the table follows the construction previously explained except that in the structure of Figs. 6 and 7 to 7d, inclusive, the detachable retainer ring 48a is at the top of the hollow axle and the integral flange 47a is at the bottom. In assembling the modified form of structure the lower cone ring 46a and set of rollers 51a are first applied to the axle as shown in Fig. 7 and then the lower cup race 38a, spacer 39a and upper cup race 37a applied thereto as illustrated in Fig. 7a. Thereafter the upper set of rollers 50a and upper cone race 45a are applied as illustrated in Fig. 7b and all of these elements inserted bodily into the recess in the table. Previously however the upper retainer ring 48a is inserted therein to be in position for subsequent preloading and matching. Before the upper retainer ring 48a is clamped, the lower retainer ring 40a is matched and bolted in position. Thereafter screws 48b, operable through one or more openings 48c provided in the table top (which are later plugged) are pulled down to preload the bearings and the space 48d measured for matching. The parts are then dismantled as far as represented by Fig. 7b and the retainer ring 48a properly matched and firmly secured to the central axle. The parts are then reassembled into the table, placed upon the bed of the machine, and the space 60a underlying the axle accurately measured and subsequently provided with a shim 64a as illustrated in Figs. 7c and 7d.

In this construction, as in the first described form, a contiguous portion of the table overlies bearing mounting and top of the axle, and in both cases the hollow axle is preassembled into the table and the bearings preloaded, prior to the mounting of the axle upon the main base. Compensation for wear is made in both cases by rematching one or more of the bearing retainer rings and adjusting the thickness of the shim that underlies the hollow axle.

It will be further observed that in both embodiments disclosed, the outer races of the bearings are definitely clamped in position and held against possible creeping. If this is not done, the creeping of the outer race, when the outer race of the bearing is carried by the rotating member, will destroy the surface with which it contacts and thus destroy the accuracy of the mounting. The detachable retainer elements 40 and 40a herein disclosed, effectively perform the added function of clamping the outer races against relative angular movement.

After the central hollow post has been journaled in the table top and the assembly positioned on the base and the post properly fitted and secured thereto, the worm drive is connected and the table is ready for use. The operator will then mount a work holding fixture 18, appropriate for the particular class of work at hand, to the table and on top of the fixture mount the gear blank. The journals 19 and 20 of the gear blank will have been previously finished true, and by the aid of one or more gauges 22 clamped to the base of the table and inside of the hole therein, the operator centers the gear blank. This is done by centering its journals with respect to the axis of rotation of the table and thereafter the work table, fixture and workpiece are firmly clamped together.

The cutter and cutter stanchion are adjusted to their proper respective positions for cutting the gear teeth in the peripheral face of the work blank and the machine is placed in operation. During the progress of the hobbing operation the work table is slowly revolved in synchronism with the movements of the hob and the cutting action continues around the work until the cutter has traversed the required distance axially of the blank in cutting of the teeth thereon.

During the entire hobbing operation the forces are downward and laterally or radially and in a table constructed in accordance with this invention the downward forces are taken substantially entirely by the flat annular bearing surfaces 30—33, which substantially underlie the marginal portions of the work fixture 18, and the lateral or radially acting forces of the operation are taken by the roller bearing mounting on the central tubular post.

In the specific examples indicated there is no tendency for the table to lift off the bearing surfaces 30—33. However, in the event that the nature of the workpiece requires an upward moving hob, thus producing a lifting force upon the table, the herein disclosed method of mounting and securing the two sets of roller bearing races between substantial shoulders on both the table, and the central post, and the bolting of the post firmly to the base of the machine, effectively insures that the table will be held down upon its annular bearing surfaces.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, we claim as new and desire to secure the following combinations and elements, or equivalents thereof, by Letters Patent of the United States:

1. A hollow rotary work table structure for gear hobbing machines comprising a base member, a pair of flat annular bearing surfaces formed upon a top surface thereof near its outer periphery; a table member having a pair of flat annular bearing surfaces formed on its under surface adapted to cooperate with the bearing surfaces upon said base member in transmitting thereto the downwardly acting forces to which the table is subjected; said base and table members each having formed therein a relatively large centrally located hole free of all obstructions; a centrally located hollow axle; means for journaling the table on said axle with their central apertures defining the wall of a cylinder, comprising an upper and a lower set of conical roller bearing means, and a detachable cup race retainer ring and a detachable cone race retainer ring for securing said bearing means to said table and to said axle respectively in preloaded condition prior to the mounting of said table and axle assembly upon the said vertical thrust bearing surfaces of the base; and means for securing said hollow axle non-rotatively to said base in a predetermined vertical position relative to said conical bearing means and to said vertical thrust bearing surfaces thereby to relieve the said post and conical bearings of substantially all downward acting thrusts.

2. A hollow rotary work table structure for gear hobbing machines comprising a base member, annular bearing surfaces formed upon a top surface thereof near its outer periphery; a table member having complemental annular bearing surfaces formed on its undersurface; said base and table members each having also formed therein a relatively large centrally located hole free of all obstructions; a centrally located hollow axle journaled in said table and overlaid by a contiguous portion of the table top; means for journaling the axle in said table with its central aperture substantially concentric with the hole in the table, comprising an upper and a lower set of conical roller bearing means, and a detachable cup race retainer ring and a detachable cone race retainer ring for securing said bearing means to said table and to said axle prior to the mounting of said table upon the said base; and means for securing the table journaled hollow axle to said base.

3. In a hobbing machine a rotary work table comprising a base member; flat annular bearing surfaces formed upon a top surface thereof near its outer periphery; a table member having flat annular bearing surfaces formed on its under surface adapted to cooperate with the bearing surfaces upon said base member in transmitting thereto the downwardly acting forces to which the table is subjected; a tubular post member; conical roller bearing means underlying contiguous portions of the work surface of the table for journaling the table on said tubular post including a detachable cup race retainer ring and a detachable cone race retainer ring for securing said bearing means respectively to said table and to said post in preloaded condition prior to the mounting of said table and post as a unitary assembly upon the said base.

4. In a hobbing machine a rotary work table comprising a base member, vertical thrust bearing surfaces formed upon a top surface thereof; a table member having vertical thrust bearing surfaces formed on its under surface adapted to coact with the bearing surfaces upon said base member in transmitting thereto the downwardly acting forces to which the table is subjected; said table also having a relatively large central hole formed therein; a hollow axle for supporting said table against radial movement; and means for journaling the said hollow axle in the table in a position as to be entirely overlaid by contiguous portions of the table comprising an upper and a lower set of roller bearing means located under the work surface of the table and remote from the central hole therein; means accessible from the underside of the table for securing said bearing means to said table and to said post respectively prior to the mounting of said table and hollow axle as an assembly upon the said base; and means for securing said journaled hollow axle to said base in its proper vertical position with respect to said vertical thrust bearing surfaces.

5. A rotatable work table for a hobbing machine comprising a table member; an axle journaled in and overlaid by contiguous parts of the table; roller bearing means mounted upon the external periphery of said axle and an inner periphery of said table, said roller bearing means being also entirely overlaid by contiguous portions of said table; means operable from the underside of the table for adjusting said bearing means for wear; a base member for supporting said table; and means for securing said axle to said base after it has been journaled properly in said table.

6. A rotatable work table comprising a table member proper having a relatively large central hole provided therein, a tubular axle journaled in the table below the surface thereof and being entirely overlaid by an integral part of the table, said axle having its bore concentrically disposed with relation to the hole in the table and forming a continuation thereof; means for journaling said axle in said table including roller bearing means between the external periphery of said axle and said table, said bearing means being also overlaid by an integral portion of said table; a base member for supporting said table; and means accessible through the central opening in said table and axle for securing the table journaled tubular axle rigidly to said base.

7. A rotatable work table for a hobbing machine comprising a table member proper having a relatively large central hole provided therein; a tubular axle journaled in the table and having its bore concentrically disposed with relation to the hole in the table; roller bearing means mounted upon the external periphery of said axle and an inner periphery of said table, said tubular axle and roller bearing means being entirely overlaid by an integral portion of said table and effectively covered thereby; a base member for supporting said table; and means accessible through the hole in said table and axle for securing said tubular axle to said base.

8. A rotatable table for a hobbing machine comprising a table member proper; an axle adapted to be journaled in and overlaid by contiguous portions of the table; means for journaling said axle in said table including conical roller bearing means between the said axle and said table, said bearing means being also overlaid by contiguous parts of the table; a base member for supporting said table and axle; and means for securing the table journaled axle to said base.

9. A rotatable table for a hobbing machine comprising a table member proper having a relatively large central hole provided therein adapted to receive the journal of a gear blank; a tubular axle journaled in and underlying the top of the table and having its bore concentrically disposed with relation to the hole in the table; a lower abutment on said axle; conical roller bearing means between the said axle and said table adapted to seat upon the abutment on said axle; means accessible and operable from the upperside of said table at a region distant from the central hole therein for seating said bearing means on said abutment; a base member for supporting said table and axle journaled therein; and means for securing said table journaled axle to said base.

10. A rotatable work table comprising a table member proper having a relatively large central hole provided therein; a tubular axle journaled in the table and being entirely overlaid by an integral part of the table; a peripheral flange on said axle; roller bearing means between the external periphery of said axle and the said table adapted to seat upon said flange; said bearing means being also overlaid by an intergral portion of said table; means operable from the upper surface of the table at a region distant from the central opening therein for seating said bearing means on said flange; a base member for supporting said table member; and means accessible through the central opening in said table and axle for securing said tubular axle rigidly to said base after it has been journaled in the said table member.

11. In a hobbing machine a rotary work table comprising a base member; vertical thrust bearing surfaces formed upon a top surface thereof; a table member having vertical thrust bearing surfaces formed on its under surface adapted to coact with the bearing surfaces upon said base member in transmitting thereto the downwardly acting forces to which the table is subjected; said table also having a relatively large central hole formed therein; a hollow axle for supporting said table against radial movement; and means for journaling the said hollow axle in the table in a position as to be entirely overlaid by an integral portion of the table comprising an upper and a lower set of antifriction radial thrust bearing means located under the work surface of the table and remote from the central hole therein; means accessible from the under side of the table for securing said bearing means to said table; means operable from the upper side of said table for securing said bearing means to said axle; and means operable through the central hole in said work table and axle for securing said hollow axle to said base after it has been journaled properly in the table member.

12. A rotary work table comprising a base member; annular bearing surfaces formed upon a top surface thereof near its outer periphery; a hollow table member overlying said base and having annular bearing surface formed on its under surface adapted to cooperate with the bearing surfaces upon said base member in transmitting thereto the downwardly acting forces to which the table is subjected; a central hollow pintle underlying a contiguous portion of the work surface of said table; radial thrust bearing means also underlying contiguous portions of the work surface of the table for journaling the table on said pintle; and annular interdigitating means between the said table and base members and between said table and the underlying central pintle member for excluding dirt or other foreign matter from said bearing surfaces.

13. A rotary work table comprising a base member; a table member overlying said base and having a central recess in its underside, the side wall of said recess defining a single cylindrical bearing surface; a central hollow pintle extending from the base into the table and having its upper end overlaid by the work surface of said table, said pintle also having a single cylindrical bearing surface on its external periphery; roller bearing means comprising an outer and an inner race fitted to said cylindrical bearing surfaces of said recess and pintle and overlaid by a portion of said table; and detachable means for securing the races of said bearing means against angular movement relative to their respective bearing surfaces.

14. A rotary work table comprising a base member; a table member having a relatively large opening in its center overlying said base and having a single cylindrical bearing surface. formed on a recess provided in its under side; a central hollow pintle extending into said recess and having its upper end overlaid by the work surface of said table, said pintle also having a single cylindrical bearing surface on its external periphery; two sets of roller bearing means, each set comprising outer and inner races, fitted to said cylindrical bearing surfaces and both sets being overlaid by a portion of said table; and means for clamping both outer races of said two sets of bearing means against creeping movement relative to the said bearing surface of said table.

WILLIAM F. ZIMMERMANN.
GRANGER DAVENPORT.